July 19, 1949.    R. C. DAVIS ET AL    2,476,844
MOTOR CONTROL CIRCUIT
Filed April 3, 1946
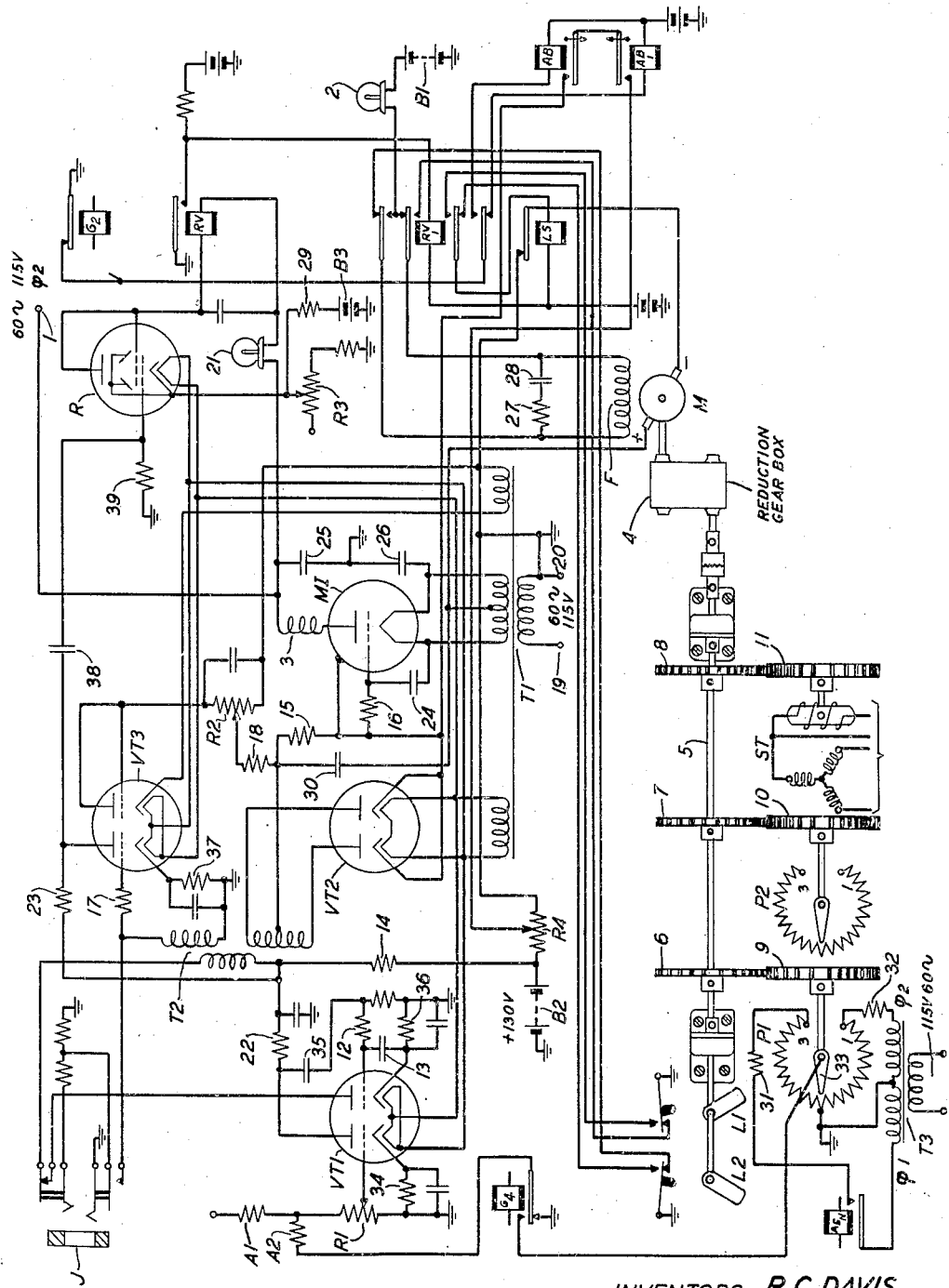
INVENTORS: R. C. DAVIS
R. H. GUMLEY
BY P. C. Smith
ATTORNEY Patented July 19, 1949

2,476,844

UNITED STATES PATENT OFFICE 2,476,844

MOTOR CONTROL CIRCUIT

Richard C. Davis, Great Neck, and Robert H. Gumley, Whitestone, N. Y., assignors to Bell Telephone Laboratories, Incorporated, New York, N. Y., a corporation of New York Application April 3, 1946, Serial No. 659,202

7 Claims. (Cl. 318—28)

This invention relates to motor control systems and more particularly to aircraft trainers whereby in response to electrical changes imposed upon some of the circuits in response to the operation of the flight or other controls of the trainer, in simulation of the operation of an aircraft, electrical changes are imposed upon other circuits of the trainer.

It is the object of the present invention to provide a control system especially adapted to aircraft trainers, although capable of general use, wherein a reversible direct current motor operable to control the operation of mechanism of the trainer is operated by alternating current potential to maintain the accurate setting of such mechanism as may be dictated by the setting of controlling elements.

A further object of the invention is to provide in a motor control system means to take up backlash in the gearing of the motor unit when the direction of rotation of the motor is reversed.

The foregoing objects and others pertinent thereto are accomplished in accordance with the present invention by the provision of a first electronic device responsive to both half cycles of either a negative or positive phase unbalance of a network supplied by alternating potentials from one or more remotely located control elements, which device establishes the rotor circuit of a direct current motor upon alternate positive half cycles of a second source of alternating current; by the provision of a second electronic device responsive only to the unbalance of the network in one phase which establishes the circuit of a relay upon each positive half cycle of the second source of current to cause a reversal of the stator circuit of the motor; and by the provision of means for applying a positive direct current bias to the grid of the first electronic device for a measured interval upon the reversal of the stator circuit of the motor, whereby the rotor circuit of the motor is given one or more power impulses to quickly take up the backlash in the gearing driven by the motor. This is accomplished by the provision of two slow-to-release relays operated over front and back contacts of the stator circuit reversing relay whereby the circuit over which direct current biasing potential is applied to the grid of the first electronic device is established for an interval sufficient to cause the electronic device to apply driving impulses to the motor.

The novel features of the invention are set forth in the appended claims and the invention as to its organization and its mode of operation will be best understood from the following detailed description when read in connection with the single sheet of drawings.

The single figure of the drawing represents diagramatically the electrical circuit of a control system in accordance with this invention.

In the drawing the motor is provided with a stator or field winding F which is excited from the source B1 of direct current over a circuit extending over either front or back contacts of the reversing relay RV1 to cause the motor to run in either one or the opposite direction. With relay RV1 released the stator circuit extends from the source of direct current B1, through the ballast lamp 2, over the inner upper back contact of relay RV1, through the stator winding F, over the upper back contact of relay RV1 and to ground over the lower contact of the limit switch L2. This will be the condition required to move the sliders of potentiometers driven by the motor toward the No. 3 terminals of the potentiometer windings and to move the cam of the limit switch L1 to cause the contacts controlled thereby to move to their alternate positions. When relay RV1 is thereafter operated, the stator circuit of the motor will extend from the source B1, through ballast lamp 2, over the outer upper front contact of relay RV1, through the stator winding F, over the inner upper front contact of relay RV1 and to ground over the alternate or lower contacts of the limit switch L1. The rotor circuit of the motor extends from a source of 115-volt 60-cycle phase φ2 alternating current connected to terminal 1, through the choke coil 3, over the anode-cathode path through the thyratron motor impulsing tube MI, when such tube fires, to the midtap of the middle secondary winding of the power transformer T1, the filament of tube MI serving as a cathode, through the rotor circuit of the motor M, over the normally closed contacts of the limit switch relay LS and to the ground terminal of the power source.

The shaft of the motor M is coupled to the driving shaft of the reduction gear box 4, the driven shaft of which is coupled to the shaft 5 upon which are mounted the operating cams of the limit switches L1 and L2 and the gears such as 6, 7 and 8 which mesh with gears such as 9, 10 and 11 mounted on the shafts of potentiometers P1 and P2 and on the rotor shaft of an "autosyn" or synchrotransmitter ST. The synchrotransmitter may, for example, be connected with a synchroreceiver for controlling an indicating instrument such as a rate-of-climb indicator.

For controlling the motor M a dual amplifier tube VT1, a dual diode rectifying tube VT2, a tube VT3, one unit of which serves to provide a third stage of signal amplification and the other unit of which serves to provide biasing potential to the gas-filled or thyratron tube MI, the thyratron tube MI, the screen grid tube R, the reversing relay RVI and the anode relay RV are provided. The control network is connected through a plurality of summing resistors such as A1 and A2, through the winding of a gain control rheostat R1 to ground, the summation control or signal potential being applied from the slider of such rheostat to the control grid of the input or left unit of amplifier tube VT1. The two units of tube VT1 are resistance coupled through resistor 12. To by-pass radio frequency disturbances which might cause false operations of the tubes R and MI, the .003 microfarad grid condenser 13 is provided.

The amplified output of the right unit of tube VT1 is applied over the anode potential supply circuit of such unit extending from the anode of the tube, over the upper normal contacts of test jack J, through the primary winding of input transformer T2 and through resistor 14 to the anode battery source B2. The output from tube VT1 is further increased in the input transformer T2, the two secondary windings of which have twice the number of turns as the primary winding. The overall potential gain from the slider of the gain control rheostat R1 to each secondary winding of transformer T2 is approximately 350.

The terminals of the lower secondary winding of input transformer T2 are connected to the anodes of the dual diode rectifier tube VT2 and the mid-point of such secondary winding is connected through resistor 15 to the cathodes of the diode tube VT2. The tube VT2 serves as a full wave rectifier to rectify the input signal potential applied to its anodes and to apply it as a positive potential through resistor 16 to the control grid of the motor impulsing thyratron tube MI.

The output of the upper secondary winding of the transformer T2 is applied through resistor 17 to the control grid of the left unit of tube VT3, is amplified thereby and applied to the control grid of the motor reversing tube R. The right unit of tube VT3 has its anode and grid connected together and connected into a circuit extending through the bias control rheostat R2, through the right secondary winding of power transformer T1 to the cathode of the right unit of tube VT3 and thereby tube VT3 functions as a rectifier to apply a normal negative bias through resistors 18, 15 and 16 to the control grid of thyratron tube MI.

Filament heating current for tubes VT1, VT2, VT3 and R is supplied from a source of alternating current connected to the terminals 19 and 20, through the primary and left secondary windings of power transformer T1, and filament heating current is supplied to the filament of tube MI from such source through the primary and middle secondary windings of transformer T1. Direct current for furnishing grid bias to the tube MI is as previously described, supplied from the same alternating current source through the primary and right secondary windings of transformer T1 and the right unit of tube VT3. Anode potential is supplied from the 60-cycle 115-volt phase φ2 source of alternating current connected to terminal 1, through choke coil 3 to the anode of thyratron tube MI and through the ballast resistance lamp 21 and the winding of relay RV to the anode of tube R. As previously described, anode potential is supplied to the anode of the right unit of amplifier tube VT1 from the source B2 through resistor 14 and the primary winding of input transformer T2. Anode potential from the source B2 is also supplied through resistor 14 and thence through resistors 22 and 23 to the anodes of the left units of tubes VT1 and VT3, respectively. The tube R is provided with cathode bias from the adjustable potential divider comprising rheostat R3 connected in series with resistor 29 to a source of biasing potential B3.

The resistors 16 and 17 in the grid circuits of tubes MI and VT3 minimize any tendency of the two tubes to affect each other by limiting the potential induced in either of the secondary windings of the input transformer T2 by the sudden change in potential across the other caused by the firing of the associated tube. Condenser 24 connected between the grid and filament of the thyratron tube MI by-passes radio frequency disturbances to prevent false operation of such tube. The radio frequency choke coil 3 connected to the anode of tube MI and the associated condensers 25 and 26 minimize the radiation of radio frequency disturbances created by the thyratron tube MI. The resistor 27 and condenser 28 connected across the terminals of the field winding F of the motor M are provided to absorb the kick from the field winding when the relay RV1 operates or releases and prevents the consequent sparking at the relay contacts.

The limit switches L1 and L2 are provided to stop the motor M when the sliders of the potentiometers have reached the ends of the useful portions of their windings. If relay RV1 is not operated, the motor can run the potentiometer wipers toward the No. 3 terminals of their windings. When they approach or reach the No. 3 terminals the limit switch L2 operates and opens at its lower contact the stator circuit of the motor M and thereafter closes at its upper contact the circuit of relay LS extending from battery through the winding of such relay, over the inner lower back contact of relay RV1, not operated, to ground over the upper contact of switch L2. Relay LS upon operating then removes ground from the rotor circuit of the motor thus doubly insuring that the motor will stop. When relay RV1 operates, switch L2 is made ineffective and the motor can run the sliders of the potentiometers toward the No. 1 terminals of their windings. Switch L1 functions when the sliders approach or are at the No. 1 terminals of their windings in the same manner as described in connection with switch L2.

In order that the blacklash in gears driven by the motor M may be quickly taken up upon any reversal in the direction of rotation of the motor and thereby a quicker response may be secured in circuits controlled through the operation of the motor unit, an impulse of direct current is applied as a positive bias to the grid of the motor impulsing tube MI for a timed interval following the operation or release of the reversing relay RV1. This direct current impulse is derived at the slider of rheostat R4, the winding of which is energized from the direct current source B2, and is applied over a circuit extending over the front contacts of the slow-to-release relays AB and AB1 and thence through resistor 16 to the grid of tube MI. If, for example, the reversing relay RV1 is unoperated, relay AB1 is energized over a circuit from ground over the back contact of relay G2, which latter relay is unoperated if the simulated flight has left ground, over the lower back contact of relay RV1 and through the winding of relay AB1 to battery. As soon as the RV1 relay operates to reverse the direction of rotation of the motor relay AB is operated in a circuit from ground over the back contact of relay G2, over the lower front contact of relay RV1 and to battery through the winding of relay AB. Upon the operation of relay RV1 the circuit of relay AB1 is opened, but such latter relay being slow to release does not release at once so that for an interval measured by the release time of relay AB1 both relays AB and AB1 remain operated and positive biasing potential is thus supplied over the previously traced circuit to the grid of tube M1. Tube M1 is thereby caused to fire on each positive half wave of the potential applied to its anode so long as the postive biasing potential remains connected to its grid and positive impulses of current are thereby transmitted through the rotor circuit of the motor to cause the motor to quickly accelerate in the reverse direction thereby taking up the backlash in all gearing driven thereby. When relay RV1 releases to again reverse the direction of the rotation of the motor M, relay AB1 reoperates and relay AB releases and tube M1 is positively biased in the same manner to cause motor M to take up the backlash in the gearing. By adjusting the rheostat R4 the value of the positive impulse of biasing potential may be adjusted.

In order that the speed control of the motor M at lower motor speeds may be attained the condenser 30 is provided. This condenser is connected in a circuit which extends from the midtap of the middle secondary winding of power transformer T1, through such condenser through resistor 18 and rheostat R2 to ground and is thus in parallel with the rotor circuit through the motor M. Thus each time the tube M1 fires to deliver a positive impulse of driving current to the motor, an increment of charge is applied to the condenser 30, so that as the charge builds up in the condenser such charge becomes a measure of the power delivered to the motor during the time the condenser is being charged. This charge is applied as a negative bias through resistors 15 and 16 to the grid of tube M1 until the negative bias increases to a point at which the incoming signal cannot cause the tube to continue firing at which time the tube M1 ceases to fire and no further impulses will be transmitted to the motor. The motor will consequently slow down or actually stop and the condenser charge will then leak off in a circuit from ground over the back contact of relay LS, through the rotor circuit of the motor, through the condenser 30, through resistor 18 and through rheostat R2 to ground until the negative bias on the grid of tube M1 becomes reduced to a point where the incoming signal is again able to cause the tube to fire and to deliver additional impulses to the motor and to the condenser. Thereupon the condenser again charges and blocks the operation of the tube to slow down or stop the motor. Thus at low values of signal input the motor is caused to operate intermittently.

The motor control circuit may be controlled from a remotely located control device over the input resistor A1 or from other remote control devices over other parallelly connected resistors similar to resistor A1 and also over the centering potentiometer P1. The winding of the centering potentiometer P1 has its mid-tap connected to the mid-tap of the secondary winding of transformer T3 and to ground and has its Nos. 1 and 3 terminals connectable through resistors 31 and 32 to the terminals of the secondary winding of transformer T3. The primary winding of transformer T3 is energized from a 115-volt 60-cycle source of alternating current and therefore with the mid-tap of its secondary winding connected to ground, 60-cycle 40-volt potential of phase $\varphi1$ is applied to the No. 3 terminal of potentiometer P1 and 60-cycle 40-volt potential of phase $\varphi2$ is applied to the No. 1 terminal of such potentiometer.

It will be assumed that a 60-cycle 40-volt signal potential of phase $\varphi1$ is applied through resistor A1 and rheostat R1 to ground and that at such time the brush 33 of the centering potentiometer P1 is at the center tap of the potentiometer winding and no potential will be applied from the slider 33 through resistor A2. A potential of phase $\varphi1$ is therefore applied over the slider of rheostat R1 to the control grid of the left unit of amplifier tube VT1. Tube VT1, whose grid-cathode circuit is completed through resistor 34 to ground, is now effective to amplify the input signal potential and to impress it upon the input circuit of the right unit of tube VT1 over a circuit which may be traced from ground through resistor 34 and over the cathode-anode path through the left unit of tube VT1 to the anode thereof, and thence through condenser 35 and resistor 12 to the control grid of the right unit of tube VT1. The input circuit for the right unit of tube VT1 is completed from the cathode of such unit through the resistor 36 to ground. The right unit of tube VT1 now further amplifies the input signal potential and impresses it upon the primary winding of step-up input transformer T2 over a circuit which may be traced from ground, through resistor 36, over the cathode-anode path through the right unit of tube VT1, over the normal contacts of jack J, through the primary winding of transformer T2 and resistor 14 to the anode supply battery B2.

The potential applied to the primary winding of transformer T2 is impressed upon the secondary windings of such transformer and stepped up thereby. This stepped-up potential is then applied over the lower secondary winding of the transformer through the full wave rectifier tube VT2 and resistors 15 and 16 to the control grid of the gas-filled or thyratron tube M1, where it appears as a positive potential.

Normal negative biasing potential is applied to the control grid of tube M1 from the right secondary winding of power transformer T1 through the right unit of tube VT3 functioning as a rectifier and through bias control rheostat R2 and resistors 18 and 16 so that tube M1 is critically biased when no signal is being received.

When positive signaling potential is impressed upon the grid of tube M1 from the rectifier tube VT2, tube M1 becomes conducting since at that instant positive potential is applied to its anode and current therefore flows from the alternating current supply connected to terminal 1 during each positive half cycle, through the choke coil 3, over the anode-cathode path through the tube M1 to the mid-point connection of the middle secondary winding of transformer T1, thence through the rotor circuit of the motor M and over the back contact of the limit switch relay LS to ground, thus energizing the rotor winding of motor M by positive impulses derived from the 60-cycle alternating anode current. The stator or field winding F of motor M is energized in a circuit which may be traced from the positive terminal of battery B1, through the ballast lamp 2, over the upper front contact of relay RV1, through the stator winding F over the inner upper front contact of relay RV1 and to ground over the alternate contacts of limit switch L1. Motor M therefore starts operating, for example, in a direction to drive the sliders of the potentiometers P1 and P2 toward the No. 1 terminals of their windings.

So long as the tube M1 is repeatedly firing in response to the positive half waves of its anode current, the motor M is receiving impulses from the positive half waves of current flowing therethrough and is thereby intermittently accelerated. During each interval that the tube M1 is non-conducting motor M is coasting at a substantially uniform speed and thereby producing a counter-electromotive force which is proportional to the speed of the motor. This counter-electromotive force is applied between ground connected over the back contact of relay LS to the right brush of motor M and the filament of tube M1 which is connected over the mid-point of the middle secondary winding of transformer T1 to the left brush of the motor. Since the grid of tube M1 is connected through resistors 16, 15 and 18, rheostat R2 to the right unit of tube VT3 and through the right secondary winding of transformer T1 to ground, this counter-electromotive force renders the filament more positive with respect to the grid and as the motor speeds up under the influence of the anode current, the counter-electromotive force builds up to a greater and greater value until it is sufficiently high to neutralize the positive grid potential supplied to the tube M1 from the incoming signal and thereby to cause the grid potential to fall below the critical potential and consequently to cut off conduction of the tube M1. Thereupon the motor no longer being supplied with current impulses tends to slow down and the counter-electromotive force consequently decreases to a point where it is no longer sufficient to neutralize the applied positive grid potential whereupon the tube M1 again becomes conducting. This phenomenon is repeated and results in the motor attaining a constant speed determined by the potential of the incoming signal. The rectifier tube VT2 is so poled that it prevents the counter-electromotive force from backing up through the transformer T2 and to the control network.

At the time the tube M1 is transmitting driving impulses through the rotor circuit of the motor, it is also applying impulses of charging current to the condenser 30 over a circuit which may be traced from the source of current connected to terminal 1, through choke coil 3, over the anode-cathode path through the tube M1 to the mid-tap of the middle secondary winding of transformer T1, through condenser 30, through resistor 18 and rheostat R2 to ground. So long as the tube M1 remains conducting the condenser receives an increment of charge each time a driving impulse is delivered to the motor, and thus the charge which builds up across the condenser becomes a measure of the power delivered to drive the motor during the time that the condenser is being charged. This charge as it builds up increases to a point at which, if the incoming signal potential applied to the grid of tube M1 through the rectifier tube V2 is small, it makes the bias on the tube of grid M1 sufficiently negative so that the incoming signal cannot fire the tube M1 and the tube will therefore cease transmitting impulses to the motor and to charge condenser 30 and consequently the motor will either slow down or actually stop depending upon its speed at such time. At this time the charge on condenser 30 will leak off in a circuit extending from ground over the back contact of relay LS, through the rotor circuit of the motor, through the condenser and through resistor 18 and rheostat R2 to ground until the negative bias on the grid of tube M1 becomes reduced to a point at which the incoming signal is again able to cause the tube M1 to fire and deliver additional impulses to the motor and to the condenser, whereupon the condenser again charges and blocks the operation of tube M1 to slow down or stop the motor. Thus, at low values of signal imput the motor is caused to operate intermittently and a slow speed control of the motor is attained.

As the motor operates, it transmits power through the reduction gear box 4 to the shaft 5 which turns at a slow speed and in turn rotates the brushes of the variable potentiometers P1 and P2 and causes the rotor of the synchrotransmitter ST to revolve. The motor will continue to operate and advance the sliders of the potentiometers and the rotor of the transmitter at a speed determined by the potential of the input signal until that potential is reduced to zero when the tube M1 will cease firing and the motor will stop, at which time the sliders of the potentiometers and the rotor of transmitter ST will remain in the position to which they have been set.

At the time the potential was impressed upon the lower secondary winding of input transformer T2 in response to an incoming signal potential to cause the firing of tube M1 and the operation of motor M, potential was also impressed upon the upper secondary winding of transformer T2 and applied therefrom through resistor 17 to the control grid of the left unit of tube VT3. Tube VT3, whose grid cathode circuit is completed through resistor 37 to ground, is now effective to further amplify the input signal potential and to apply it upon the input circuit of tube R over a circuit which may be traced from ground through resistor 37, over the cathode-anode path through the left unit of tube VT3, through condenser 38 and resistance 39 to ground, the potential at the junction point between condenser 38 and resistor 39 being applied to the control grid of the motor reversing control tube R. The tube R is normally biased by the connection of positive potential to its cathode from the slider of rheostat R3 and the anode of tube R is supplied with 115-volt 60-cycle anode potential of phase $\varphi 2$ from the source connected to terminal 1 as previously described. Thus, with the assumption that the signal potential connected to resistor A1 is of phase $\varphi 1$, this signal as amplified by the tubes VT1 and VT3 will be in phase with the phase of the anode potential supplied to tube R and the grid of tube R will be rendered less negative at each instant when positive potential is applied to its anode and the tube will therefore conduct sufficiently to permit the operation of the anode relay RV and the consequent operation of the reversing relay RV1 and the motor will operate in the direction previously described.

It will now be assumed that a potential of phase $\varphi 2$ becomes applied through resistor A1 and rheostat R1 and that a potential of phase $\varphi 2$ is thereby applied to the control grid of the left unit of amplifier tube VT1. This potential is amplified by the two units of such tube and is impressed upon the secondary windings of input transformer T2. As previously described, this signal potential is impressed from the lower secondary winding of transformer T2 upon the rectifier tube VT2 which functions as a full wave rectifier and the rectified positive potential is impressed upon the control grid of tube MI. Alternating current potential of phase φ2 is applied to the anode of tube MI, but due to the fact that the tube VT2 rectifies both half waves of the signal potential, during the positive half waves of the anode potential of phase φ2 both the grid and anode of tube MR will be positive and the tube will become conducting resulting in the transmission of an impulse of positive potential through the rotor circuit of motor M during each positive half cycle of the anode current.

At the same time the signal potential is impressed from the upper secondary winding of transformer T2 upon the grid of the left unit of tube VT3, is amplified by such tube and is impressed upon the control grid of tube R. This potential will be so phased that it will be negative during each positive half cycle of the phase φ2 anode potential applied to the tube R and consequently tube R will not become sufficiently conducting during each positive half cycle of the anode potential to cause the operation of the anode relay RV. The RVI relay will not therefore operate to reverse the connection of the terminals of the stator winding F of the motor M with respect to battery BI and ground.

In the manner previously described when the reversing relay RVI releases, the relays AB and ABI function to apply an impulse of positive grid bias to the grid of tube MI for an interval determined by the slow-to-release characteristic of relay AB so that the rotor circuit of the motor M will quickly receive driving impulses to cause the backlash in the gearing of the motor unit to be taken up before the motor is operated by the tube MI under the control of the input signal.

Now, with the tube MI rendered conductive in response to the input signal potential, impulses of current are applied thereby to continue the rotation of the motor in a direction effective to cause the sliders of potentiometers PI and P2 to move toward the No. 3 terminals of their windings. This will continue at a speed determined by the value of the input signal potential until such potential is reduced to a zero value.

When it becomes desirable to center the sliders of the potentiometers in their normal positions at the center points of their respective windings, the G4 and ASN relays become operated, as for example, when a grounded condition of flight is being simulated and there is no air-speed. If it be assumed that at this time the slider of potentiometer PI is at a point between the center tap and the No. 3 terminal of the potentiometer winding, potential of phase φ1 will be applied over the contacts of relay ASN to the No. 3 terminal of the potentiometer winding and consequently with relay G4 operated, the potential of phase φ1 will be applied from slider 33 of potentiometer PI, over the front contacts of relay G4 and through resistor A2 and rheostat RI to ground and potential of phase φ1 will be applied to the control grid of the left unit of tube VT1. This potential will be amplified by the two units of tube VT1 and by the left unit of tube VT3 and will appear as a potential of phase φ2 on the control grid of tube R. This potential will cause tube R to become more conducting on each positive half cycle of the anode potential of phase φ2 applied to its anode and as a consequence relay RV will be operated and in turn will cause the operation of relay RVI. Since it has been assumed that a grounded condition of flight is now being simulated, relay G2 will be operated and consequently relays AB and ABI will not function at this time to apply a positive biasing potential to the control grid of tube MI for the purpose of taking up the backlash in the gearing of the motor unit.

At the time that signal potential of phase φ2 was applied to the control grid of the tube R, tube MI also was caused to fire in response to positive half waves of its anode potential to transmit driving impulses of current through the rotor circuit of the motor M in the manner previously described. The motor M is thus operated in a direction of rotation to move the sliders of the potentiometers PI and P2 towards the No. 1 terminals of their windings. As the slider 33 of potentiometer PI approaches the mid-tap of its winding, the phase φ1 potential applied therefrom through resistor A2 to the input of tube VT1 becomes gradually reduced and therefore the motor M gradually slows down until when the slider 33 is at the grounded mid-tap position of potentiometer winding and the signal potential therefore becomes zero, the motor comes to rest. The rate of climb indicator if controlled by the synchrotransmitter ST will now indicate a zero rate of climb.

Had the slider 33 of potentiometer PI been at a point below the center tap of the potentiometer winding, then the phase φ2 applied therefrom to the grid of tube VT1 would have caused the motor M to rotate in a direction to move the sliders of the potentiometers toward the No. 3 terminals of their windings, until the slider 33 reached the grounded mid-tap position when the phase φ2 potential would have been reduced to zero and the motor would have come to rest.

What is claimed is:

1. In an electrical network unbalanced by a change in the magnitude of a condition under measurement, a motor having a rotor circuit and a stator circuit, a first electronic device responsive to establish the rotor circuit of said motor upon the unbalance of said network in either a positive or a negative sense, a relay for reversing the stator circuit of said motor, a second electronic device for controlling the operation of said relay upon the unbalance of said network in one of said senses, and means operative during the release or the energization of said relay to change the direction of rotation of said motor for causing said first electronic device to establish the rotor circuit of said motor in anticipation of driving the motor in the reverse direction in response to a change in the sense of the unbalance of the network.

2. In an electrical network, a first source of alternating current, means for applying potential from said source to said network to cause an unbalance thereof in accordance with the condition under measurement, a direct current motor having a rotor circuit and a stator circuit, a source of direct current for energizing said stator circuit, a second source of alternating current, a first electronic device having its anode potential supplied from said latter source in series with said rotor circuit, said electronic device being responsive to the unbalance of said network in either a positive or a negative sense, a relay for controlling the reversal of the stator circuit of said motor, a second electronic device having its anode potential supplied from said latter source in series with said relay, said latter electronic device being responsive to operate said relay upon an unbalance of said network in one of said senses, and means operative during the release or the energization of said relay to change the direction of rotation of said motor for causing said first electronic device to establish the rotor circuit of said motor in anticipation of driving the motor in the reverse direction in response to a change in the sense of the unbalance of the network.

3. In an electrical network unbalanced by a change in the magnitude of a condition under measurement, a motor having a rotor circuit and a stator circuit, a first electronic device responsive to establish the rotor circuit of said motor upon the unbalance of said network in either a positive or a negative sense, a relay for reversing the stator circuit of said motor, a second electronic device for controlling the operation of said relay upon the unbalance of said network in one of said senses, gearing driven by said motor and means operative during the release or the energization of said relay to change the direction of rotation of said motor for causing said first electronic device to establish the rotor circuit of said motor in anticipation of driving the motor in the reverse direction in response to a change in the sense of the unbalance of the network whereby the backlash in said gearing is taken up.

4. In an electrical network unbalanced by a change in the magnitude of a condition under measurement, a motor having a rotor circuit and a stator circuit, a first electronic device responsive to establish the rotor circuit of said motor upon the unbalance of said network in either a positive or a negative sense, a relay for reversing the stator circuit of said motor, a second electronic device for controlling the operation of said relay upon the unbalance of said network in one of said senses, a source of biasing current and means operative during the release or the energization of said relay to change the direction of rotation of said motor for applying a timed impulse of potential from said source to the control grid of said first electronic device whereby said first electronic device is caused to function to establish the rotor circuit of said motor in anticipation of driving the motor in the reverse direction in response to a change in the sense of the unbalance of the network.

5. In an electrical network unbalanced by a change in the magnitude of a condition under measurement, a motor having a rotor circuit and a stator circuit, a first electronic device responsive to establish the rotor circuit of said motor upon the unbalance of said network in either a positive or a negative sense, a relay for reversing the stator circuit of said motor, a second electronic device for controlling the operation of said relay upon the unbalance of said network in one of said senses, a source of direct current and means operative during the release or the energization of said relay to change the direction of rotation of said motor for applying potential from said source to render the control grid of said first electronic device sufficiently positive to cause said device to function to establish the rotor circuit of said motor in anticipation of driving the motor in the reverse direction in response to a change in the sense of the unbalance of the network.

6. In an electrical network unbalanced by a change in the magnitude of a condition under measurement, a motor having a rotor circuit and a stator circuit, a first electronic device responsive to establish the rotor circuit of said motor upon the unbalance of said network in either a positive or a negative sense, a relay for reversing the stator circuit of said motor, a second electronic device for controlling the operation of said relay upon the unbalance of said network in one of said senses, a source of direct current, two slow-to-release relays operable respectively in the operated and the unoperated positions of said first relay, and a circuit jointly controlled by said two relays for applying potential from said source to render the control grid of said first electronic device sufficiently positive for an interval determined by the slow-releasing characteristic of the operated one of said two relays to cause said first device to function to establish the rotor circuit of said motor in anticipation of driving the motor in the reverse direction in response to a change in the sense of the unbalance of the network.

7. In an electrical network unbalanced by a change in the magnitude of a condition under measurement, a motor having a rotor circuit and a stator circuit, a first electronic device responsive to establish the rotor circuit of said motor upon the unbalance of said network in either a positive or a negative sense, a relay for reversing the stator circuit of said motor, a second electronic device for controlling the operation of said relay upon the unbalance of said network in one of said senses, a source of direct current, two slow-to-release relays operable respectively in the operated and the unoperated positions of said first relay, a circuit jointly controlled by said two relays for applying potential from said source to render the control grid of said first electronic device sufficiently positive for an interval determined by the slow-releasing characteristic of the operated one of said two relays to cause said first device to function to establish the rotor circuit of said motor in anticipation of driving the motor in the reverse direction in response to a change in the sense of the unbalance of the network, and means for varying the value of the biasing potential derived from said direct current source.

RICHARD C. DAVIS.
ROBERT H. GUMLEY.

REFERENCES CITED

The following references are of record in the file of this patent:

UNITED STATES PATENTS

| Number | Name | Date |
| --- | --- | --- |
| 1,960,350 | Shackleton et al. | May 29, 1934 |
| 2,421,632 | Livingston | June 3, 1947 |